United States Patent
Ogyu et al.

(10) Patent No.: US 8,080,211 B2
(45) Date of Patent: Dec. 20, 2011

(54) HONEYCOMB FILTER

(75) Inventors: Kazutake Ogyu, Ibi-gun (JP); Toyoki Ogasawara, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/762,390

(22) Filed: Apr. 19, 2010

(65) Prior Publication Data

US 2011/0085941 A1    Apr. 14, 2011

(30) Foreign Application Priority Data

Oct. 9, 2009  (WO) .................. PCT/JP2009/067674

(51) Int. Cl.
*B01D 50/00*    (2006.01)

(52) U.S. Cl. ........................................... 422/180

(58) Field of Classification Search .............. 422/168, 422/177, 180
See application file for complete search history.

(56) References Cited

U.S. PATENT DOCUMENTS

| | | | | |
|---|---|---|---|---|
| 4,867,954 | A | * | 9/1989 | Staniulis et al. ........... 423/239.1 |
| 5,589,147 | A | * | 12/1996 | Farnos et al. ............... 423/239.2 |
| 5,914,187 | A | * | 6/1999 | Naruse et al. .................. 428/327 |
| 2005/0247038 | A1 | * | 11/2005 | Takahashi ....................... 55/523 |
| 2006/0093784 | A1 | | 5/2006 | Komori et al. |
| 2006/0168928 | A1 | | 8/2006 | Bardon |
| 2007/0129236 | A1 | * | 6/2007 | Liu et al. ........................ 502/74 |
| 2008/0045405 | A1 | | 2/2008 | Beutel et al. |
| 2009/0143221 | A1 | | 6/2009 | Ogunwumi et al. |
| 2010/0098903 | A1 | | 4/2010 | Tsuneyoshi et al. |

FOREIGN PATENT DOCUMENTS

| | | |
|---|---|---|
| EP | 1452702 | 9/2004 |
| EP | 2130592 | 12/2009 |
| JP | 2005-299520 | 10/2005 |
| JP | 2007-528959 | 10/2007 |
| JP | 2007-285295 | 11/2007 |
| JP | 2007-296514 | 11/2007 |
| WO | WO 2005/002709 | 1/2005 |
| WO | WO 2009/004912 | 1/2009 |

OTHER PUBLICATIONS

Extended European Search Report for corresponding EP Application No. 10156322.9-2113, Jun. 16, 2010.
International Search Report for corresponding International Application No. PCT/JP2009/067674, Mar. 30, 2010.

* cited by examiner

*Primary Examiner* — Tom Duong
(74) *Attorney, Agent, or Firm* — Ditthavong Mori & Steiner, P.C.

(57) ABSTRACT

A honeycomb filter includes a honeycomb structure and a zeolite. The honeycomb structure has cell walls to define cells between the cell walls. The zeolite is supported on the cell walls. An amount of the zeolite is from about 80 g/L to about 150 g/L. A porosity of the cell walls is from about 55% to about 65%. A cell density in a cross section perpendicular to the longitudinal direction is from about 46.5 pcs/cm² to about 62.0 pcs/cm². A thickness of the cell walls is from about 0.2 mm to about 0.3 mm. The cells include a large volume cell and a small volume cell. An area ratio of a cross sectional area of the large volume cell relative to a cross sectional area of the small volume cell is from about 1.4 to about 2.4.

27 Claims, 7 Drawing Sheets

A-A line cross-sectional view

B-B line cross-sectional view

HONEYCOMB FILTER

CROSS-REFERENCE TO RELATED APPLICATIONS

The present application claims priority under 35 U.S.C. §119 to International Application No. PCT/JP2009/067674 filed on Oct. 9, 2009, the contents of which are incorporated herein by reference in their entirety.

BACKGROUND OF THE INVENTION

1. Field of the Invention

The present invention relates to a honeycomb filter.

2. Discussion of the Background

Particulate matter (hereinafter, also referred to as "PM") such as soot is contained in exhaust gases discharged from internal combustion engines such as diesel engines, and has raised problems as contaminants harmful to the environment and the human body. Also, people have been worried about influence of toxic gas components such as CO, HC, and NOx contained in exhaust gases on the environment and the human body as well.

For the above reasons, exhaust gas purifying apparatuses for collecting PM or converting toxic gas component in exhaust gases have been used.

Honeycomb structures made of ceramics or the like are used for manufacturing the exhaust gas purifying apparatuses. When exhaust gases are passed through the honeycomb structure, those gases can be purified (converted).

A honeycomb structure for collecting PM in exhaust gases in an exhaust gas purifying apparatus has a large number of cells each sealed at either end thereof and placed longitudinally in parallel with one another with a cell wall interposed therebetween. Therefore, exhaust gases flowing into one of the cells surely pass through the cell wall separating the cells and then flow out from other cells. Therefore, when a honeycomb structure of this kind is installed in an exhaust gas purifying apparatus, PM contained in exhaust gases are captured by the cell walls upon passing through the honeycomb structure. The cell walls of the honeycomb structure function as filters through which the exhaust gases are purified.

Japanese Translation of PCT International Application Publication (JP-T) No. 2007-528959 discloses a honeycomb structure in which cells each sealed at an end on the gas outlet side are defined as cells having a large volume (hereinafter, also referred to as large volume cells) and cells each sealed at an end on the gas inlet side are defined as cells having a small volume (hereinafter, also referred to as small volume cells).

In the honeycomb structure of this kind, a total area of apertures on the gas inlet side is relatively made larger than a total area of apertures on the gas outlet side so that the honeycomb structure, when used as a filter for purifying exhaust gases, can capture a large amount of PM.

On the other hand, as a honeycomb structure to be used for converting NOx in exhaust gases in an exhaust gas purifying apparatus, a honeycomb structure for converting NOx in which no end of the cells is sealed and a catalyst for converting NOx is supported on cell walls has been known.

The contents of JP-T 2007-528959 are incorporated herein by reference in their entirety.

SUMMARY OF THE INVENTION

According to one aspect of the present invention, a honeycomb filter includes a honeycomb structure and a zeolite. The honeycomb structure has cell walls extending along a longitudinal direction of the honeycomb structure to define cells between the cell walls. Each of the cells is sealed at either end of each of the cells. The zeolite is supported on the cell walls of the honeycomb structure. An amount of the zeolite supported on the cell walls is from about 80 g/L to about 150 g/L. A porosity of the cell walls of the honeycomb structure is from about 55% to about 65%. A cell density in a cross section perpendicular to the longitudinal direction of the honeycomb structure is from about 46.5 pcs/cm$^2$ to about 62.0 pcs/cm$^2$. A thickness of the cell walls of the honeycomb structure is from about 0.2 mm to about 0.3 mm. The cells include a large volume cell and a small volume cell. An area ratio of a cross sectional area of the large volume cell perpendicular to the longitudinal direction relative to a cross sectional area of the small volume cell perpendicular to the longitudinal direction is from about 1.4 to about 2.4.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
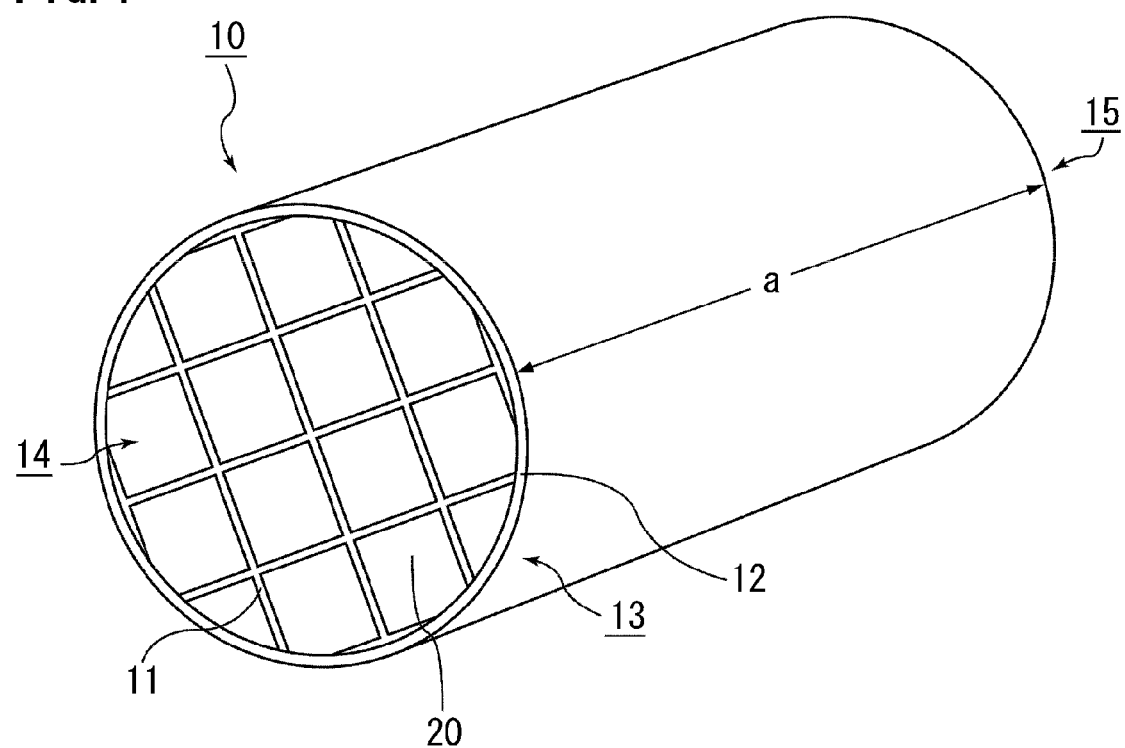
FIG. 1 is a perspective view that schematically shows one example of a honeycomb structure forming the honeycomb filter according to the first embodiment of the present invention.

In conventional exhaust gas purifying apparatus, a honeycomb structure for capturing PM in exhaust gases and a honeycomb structure for converting NOx are different members respectively disposed in different metal containers, and thus they occupy a large volume in an exhaust gas line.

For this reason, decrease of the volume occupied by the exhaust gas purifying apparatus has been desired.

A urea SCR (Selective Catalytic Reduction) device has recently been proposed for converting NOx in exhaust gases.

In the urea SCR device, an aqueous urea solution is sprayed in an exhaust gas purifying apparatus provided with a honeycomb structure in which a catalyst such as zeolite is supported on cell walls. Ammonia is generated due to thermal decomposition of the urea, and the ammonia with the action of zeolite reduces NOx to $N_2$.

Accordingly, a urea SCR device can convert NOx.

In this description, the honeycomb structure in which a catalyst such as zeolite is supported on the cell walls is referred to as honeycomb filter.

In order to develop a honeycomb filter having an excellent NOx conversion rate when it is used as a urea SCR device, the present inventors have tried to manufacture a honeycomb filter by allowing the honeycomb structure disclosed in JP-T 2007-528959 to support zeolite.

As mentioned earlier, the conventional honeycomb structure disclosed in JP-T 2007-528959 has a larger aperture area on the gas inlet side than the aperture area on the gas outlet side, and thus it is considered to have an excellent PM capturing efficiency. Then, the present inventors have tried to improve the NOx conversion rate of the honeycomb structure disclosed in JP-T 2007-528959.

First, the present inventors have conceived that, when the cell wall of the honeycomb fired body disclosed in JP-T 2007-528959 supports a large amount of zeolite, the contact between the zeolite and NOx tends to be increased so that the NOx conversion rate tends to be improved.

Further, in order to allow the cell walls of the honeycomb structure to support a large amount of zeolite, it is known to be necessary to increase the porosity of the honeycomb structure on which zeolite is to be supported.

The present inventors have manufactured a honeycomb filter in which a large amount of zeolite is supported on cell walls of a honeycomb structure by increasing the porosity of the honeycomb structure described in JP-T 2007-528959.

In the case of the honeycomb filter manufactured by the foregoing method, however, the value of NOx conversion rate when it was used in a urea SCR device was not sufficient.

The present inventors investigated factors that have influences on the NOx conversion rate when the honeycomb filter is used in a urea SCR device.

As a result, the present inventors came to conceive that, in order to improve the NOx conversion rate, it is not only necessary to increase the porosity of the honeycomb structure by allowing the honeycomb structure to support a large amount of zeolite but to make zeolite sufficiently contact NOx.

The present inventors have thus found that, in a honeycomb structure having a large volume cell and a small volume cell, a large amount of zeolite tends to be supported on the cell walls of the honeycomb structure without greatly increasing a pressure loss, and also NOx and the zeolite are more likely to sufficiently contact with each other, when the porosity of the cell walls of the honeycomb structure, the cell density of a cross section perpendicular to the longitudinal direction of the honeycomb structure, the thickness of the cell walls of the honeycomb structure, and an area ratio of a cross sectional area of the large volume cell perpendicular to the longitudinal direction relative to a cross sectional area of the small volume cell perpendicular to the longitudinal direction are respectively controlled to be in predetermined ranges. Accordingly, the present inventors have completed the present invention.

Namely, the honeycomb filter according to an embodiment of the present invention includes a honeycomb structure having a large number of cells each sealed at either end thereof and placed longitudinally in parallel with one another with a cell wall therebetween and a zeolite supported on the cell wall of the honeycomb structure, wherein an amount of the zeolite supported on the cell wall is from about 80 g/L to about 150 g/L, a porosity of the cell wall of the honeycomb structure is from about 55% to about 65%, a cell density in a cross section perpendicular to the longitudinal direction of the honeycomb structure is from about 46.5 pcs/cm² to about 62.0 pcs/cm², a thickness of the cell wall of the honeycomb structure is from about 0.2 mm to about 0.3 mm, the large number of cells include a large volume cell and a small volume cell, and an area ratio of a cross sectional area of the large volume cell perpendicular to the longitudinal direction relative to a cross sectional area of the small volume cell perpendicular to the longitudinal direction is from about 1.4 to about 2.4.

In the honeycomb filter according to the embodiments of the present invention, the amount of zeolite supported on the cell wall is from about 80 g/L to about 150 g/L.

When zeolite is supported on the cell walls in an amount of from about 80 g/L to about 150 g/L, the honeycomb filter tends to sufficiently convert NOx in exhaust gases when used as a urea SCR device.

In the honeycomb filter according to the embodiments of the present invention, the porosity of the cell wall of the honeycomb structure is from about 55% to about 65%. Therefore, the cell wall of the honeycomb structure tends to support a large amount of zeolite.

In the case where the porosity of the cell wall of the honeycomb structure is about 55% or more, when a large amount of zeolite is supported on the honeycomb structure, pores of the cell wall are less likely to be clogged with zeolite, making it easier for exhaust gases to pass through the cell wall. The exhaust gases are thus more likely to be diffused, and as a result, the effect of zeolite is more likely to be sufficiently exerted. In the case where the porosity of the cell wall of the honeycomb structure is about 65% or less, the heat capacity of the honeycomb structure body tends not to become too small. As a result, the temperature of the honeycomb filter is less likely to increase in a regeneration process for burning PM, and thus the catalyst is less likely to be deactivated. Further, the porosity of the honeycomb structure of about 65% or less tends not to reduce the strength of the honeycomb structure.

Moreover, in the honeycomb filter according to the embodiments of the present invention, the cell density in the cross section perpendicular to the longitudinal direction (hereinafter, also referred to simply as cell density) of the honeycomb structure is from about 46.5 pcs/cm² to about 62.0 pcs/cm².

Thus, the filtration area of the honeycomb structure body is more likely to become large, and the rate of the exhaust gases passing through the cell walls tends to be lowered. Therefore the zeolite supported on the cell walls tends to sufficiently contact NOx in the exhaust gases, and consequently, a honeycomb filter having a high NOx conversion rate tends to be obtained.

Further, in the honeycomb filter according to the embodiments of the present invention, the thickness of the cell wall of the honeycomb structure is from about 0.2 mm to about 0.3 mm. Therefore, exhaust gas may diffuse easily and more likely to take sufficient time to pass through the cell wall, making it easier for exhaust gas to sufficiently contact NOx in the zeolite supported on the cell wall. As a result, a honeycomb filter having a high NOx conversion rate tends to be obtained.

Furthermore, in the honeycomb filter according to the embodiments of the present invention, the large number of cells include large volume cells and small volume cells. Therefore, the honeycomb filter tends to capture a large amount of PM in exhaust gases.

In the honeycomb filter according to the embodiments of the present invention, an area ratio of a cross sectional area of the large volume cell perpendicular to the longitudinal direction relative to a cross sectional area of the small volume cell perpendicular to the longitudinal direction (hereinafter, also simply referred to as area ratio) is from about 1.4 to about 2.4. Therefore, the honeycomb filter shows an excellent NOx conversion rate when used as a urea SCR device.

When the area ratio is about 1.4 or more, the effect of reducing the rate of exhaust gases passing through the cell walls may be obtained easily, and also the effect due to the inclusion of the large volume cells and the small volume cells may be obtained easily. When the area ratio is about 2.4 or less, a proportion of the cell walls separating the large volume cells from one another is less likely to become high, and thus the amount of zeolite supported on the cell walls separating the large volume cell and the small volume cell is more likely to be increased. As exhaust gases easily pass through the cell wall interposed between the large volume cell and the small volume cell, the zeolite supported on the cell walls tends to contribute to NOx conversion. As a result, the NOx conversion rate when the honeycomb filter is used as a urea SCR device is less likely to be decreased.

In the honeycomb filter according to the embodiments of the present invention, a cross section of the large volume cell perpendicular to the longitudinal direction has a substantially octagonal shape, and a cross section of the small volume cell perpendicular to the longitudinal direction has a substantially quadrangular shape. The honeycomb filter including the cells having those cross sectional shapes is excellent in mechanical properties.

In the honeycomb filter according to the embodiments of the present invention, a cross section of the large volume cell perpendicular to the longitudinal direction has a substantially quadrangular shape, and a cross section of the small volume cell perpendicular to the longitudinal direction has a substantially quadrangular shape.

As the honeycomb filters according to the embodiments of the present invention have cells having the aforementioned cross sectional shapes, those honeycomb filters tend to be more preferably used for capturing PM in the exhaust gases and further for converting NOx in the exhaust gases.

In the honeycomb filter according to the embodiments of the present invention, the zeolite is at least one species selected from the group consisting of a β-type zeolite, a ZSM-5 type zeolite, and a SAPO.

As those zeolites are excellent in gas diffusion properties and resistance to water and heat, NOx in exhaust gases tends to be preferably converted.

In the honeycomb filter according to the embodiments of the present invention, the zeolite is ion-exchanged with a copper ion and/or an iron ion.

In the honeycomb filter according to the embodiments of the present invention, the honeycomb structure includes a plurality of honeycomb fired bodies combined with one another with an adhesive layer interposed therebetween.

First Embodiment

The following description will discuss the first embodiment of the present invention which is one embodiment of the honeycomb filter according to the present invention.

The honeycomb filter of the present embodiment is provided by allowing the cell wall of the honeycomb structure to support zeolite.

As mentioned earlier, in the present description, a honeycomb structure in which zeolite is not supported on the cell wall is referred to as "honeycomb structure" and a honeycomb structure in which zeolite is supported on the cell wall is referred to as "honeycomb filter" to differentiate them from each other.

FIG. 1 is a perspective view that schematically shows one example of a honeycomb structure forming the honeycomb filter according to the first embodiment of the present invention.

Figure 2A:
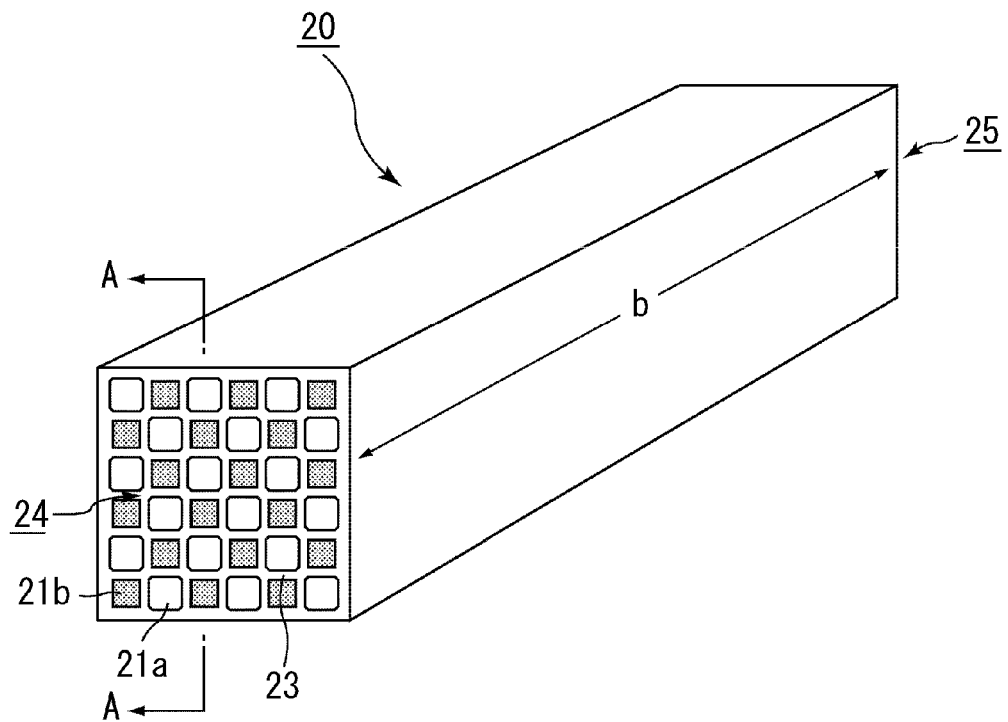
FIG. 2A is a perspective view that schematically shows one example of a honeycomb fired body forming the honeycomb structure shown in FIG. 1.
Figure 2B:
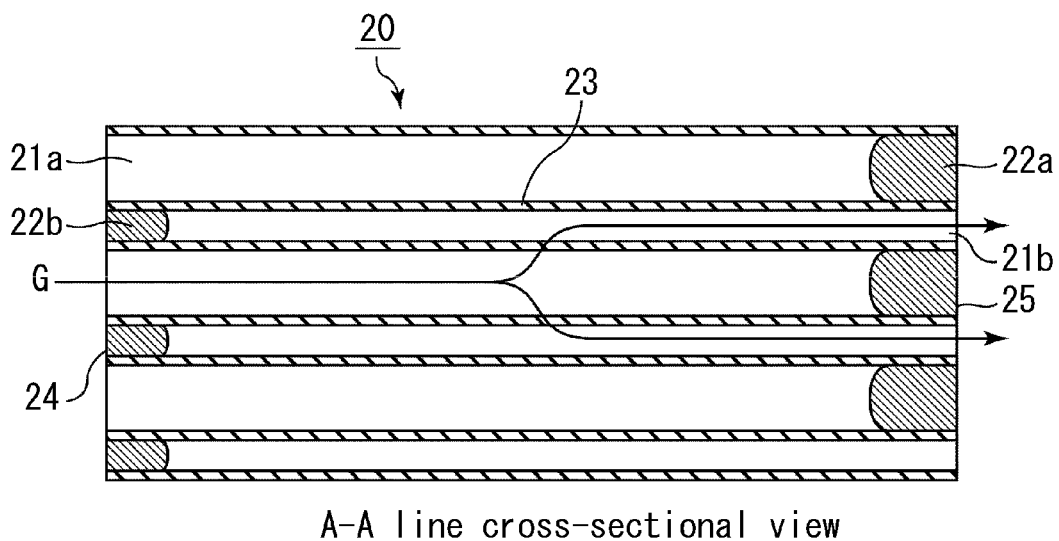
FIG. 2B is an A-A line cross-sectional view of the honeycomb fired body shown in FIG. 2A.

FIG. 2A is a perspective view that schematically shows one example of a honeycomb fired body forming the honeycomb structure shown in FIG. 1, and FIG. 2B is an A-A line cross-sectional view of the honeycomb fired body shown in FIG. 2A.

A honeycomb structure 10 shown in FIG. 1 is provided by bonding a plurality of honeycomb fired bodies 20 each made of a porous ceramic with one another by interposing an adhesive layer 11 therebetween to construct a ceramic block 13, and then forming a coat layer 12 for preventing leak of exhaust gases around the ceramic block 13. The coat layer 12 may be formed when necessary.

A honeycomb structure provided by bonding a plurality of honeycomb fired bodies as mentioned earlier is referred also as an aggregated honeycomb structure.

The main component of constituent materials of the aggregated honeycomb structure is desirably silicon carbide or silicon carbide containing silicon.

The honeycomb structure 10 includes a plurality of cells placed in parallel with one another with a cell wall interposed therebetween in a longitudinal direction (direction of the double-sided arrow "a" in FIG. 1), a first end face 14 and a second end face 15. The following description will discuss positional relation among the first end face 14, the second end face 15 and the plurality of the cells.

In the honeycomb fired body 20 shown in FIG. 2A and FIG. 2B, the plurality of cells include large volume cells 21a each having a relatively larger cross-sectional area perpendicular to the longitudinal direction thereof (direction of the double-sided arrow "b" in FIG. 2A) than small volume cells 21b, and the small volume cells 21b each having a relatively smaller cross-sectional area perpendicular to the longitudinal direction thereof than the large volume cells 21a, and the large volume cells 21a and the small volume cells 21b are alternately disposed one by one.

The large volume cell 21a has a substantially octagonal shape in the cross section perpendicular to the longitudinal direction thereof. The small volume cell 21b has a substantially quadrangular shape in the cross section perpendicular to the longitudinal direction thereof.

The honeycomb fired body 20 has a first end face 24 and a second end face 25.

The large volume cell 21a is open at an end portion on the first end face 24 side of the honeycomb fired body 20 and is sealed with a sealing material 22a at an end portion on the second end face 25 side of the honeycomb fired body 20. On the other hand, the small volume cell 21b is open at an end portion on the second end face 25 side of the honeycomb fired body 20 and is sealed with a sealing material 22b at an end portion on the first end face 24 side of the honeycomb fired body 20.

A cell wall 23 interposed between the large volume cell 21a and the small volume cell 21b functions as a filter.

Namely, exhaust gases G (in FIG. 2B, "G" indicates exhaust gases and the arrow indicates a flowing direction of exhaust gases) introduced to the large volume cell 21a surely pass through the cell wall 23 interposed between the large volume cell 21a and the small volume cell 21b and then flow out from the small volume cell 21b.

The honeycomb structure 10 includes a plurality of the honeycomb fired bodies 20 which are arranged and bonded with one another in a manner that the first end face 24 of each of the honeycomb fired bodies 20 forms the first end face 14 of the honeycomb structure 10, and the second end face 25 of each of the honeycomb fired bodies 20 forms the second end face 15 of the honeycomb structure body 10.

Accordingly, in the honeycomb structure 10, the large volume cells 21a are open at the end portions on the first end face 14 of the honeycomb structure and are sealed at the end portions on the second end face 15. On the other hand, the small volume cells 21b are open at the end portions on the second end face 15 of the honeycomb structure 10 and are sealed at the end portions on the first end face 14.

The cross-sectional shape of each of the large volume cells and that of each of the small volume cells perpendicular to the longitudinal direction thereof may be other than the shape shown in FIG. 2A and FIG. 2B. The cross-sectional shape of the large volume cell perpendicular to the longitudinal direction may be substantially quadrangular, and the cross-sectional shape of the small volume cell perpendicular to the longitudinal direction thereof may be substantially quadrangular.

The area ratio of the cross-sectional area of the large volume cell perpendicular to the longitudinal direction relative to the cross-sectional area of the large volume cell perpendicular to the longitudinal direction (cross-sectional area of the large volume cell perpendicular to the longitudinal direction/cross-sectional area of the small volume cell perpendicular to the longitudinal direction) according to the honeycomb structure of the present embodiment is from about 1.4 to about 2.4.

The aforementioned area ratio is more desirably from about 1.5 to about 2.4.

The porosity of the cell wall of the honeycomb structure of the present embodiment is from about 55% to about 65%.

In the present description, the porosity of the cell wall of the honeycomb structure can be measured through a conventionally known method such as a weighing method, a mercury porosimetry method, Archimedes method, and a measuring method using a scanning electronic microscope (SEM).

In the present embodiment, the porosity of the cell wall of the honeycomb structure refers to the porosity of the cell wall of the honeycomb fired body which forms the honeycomb structure.

The cell density in a cross section perpendicular to the longitudinal direction of the honeycomb structure of the present embodiment is from about 46.5 pcs/cm$^2$ to about 62.0 pcs/cm$^2$ (from about 300 pcs/inch$^2$ to about 400 pcs/inch$^2$).

In the present Description, the cell density in a cross section perpendicular to the longitudinal direction of the honeycomb structure referred herein is the value obtained by dividing the number of cells present in the cross section perpendicular to the longitudinal direction of the honeycomb structure by an area of the cross section excluding the area occupied by the adhesive layer. In the present embodiment, the cell density of the honeycomb structure refers to the cell density of the honeycomb fired body forming the honeycomb structure.

The thickness of the cell wall of the honeycomb structure of the present embodiment is from about 0.2 mm to about 0.3 mm.

In the present Description, the thickness of the cell wall of the honeycomb structure used herein refers to the thickness of the cell wall between the large volume cell and the small volume cell.

Further, zeolite is supported on the cell wall of the honeycomb structure of the present embodiment.

In the present description, zeolite includes not only aluminosilicate but analogues of zeolite such as aluminophosphate and aluminogermanate as well.

Examples of zeolite to be supported on the cell wall of the honeycomb structure include β-type zeolite, Y-type zeolite, ferrierite, ZSM-5 type zeolite, mordenite, faujasite, A-type zeolite, L-type zeolite, SAPO (Silicoaluminophosphate), MeAPO (Metalaluminophosphate), and the like. Each of these may be used alone or two or more kinds of these may be used in combination.

β-type zeolite, ZSM-5 type zeolite, or SAPO is preferable among the above zeolites. Preferable among SAPO is SAPO-5, SAPO-11, or SAPO-34, and SAPO-34 is more preferable. Preferable among MeAPO is MeAPO-34.

The amount of zeolite (hereinafter, also referred to as zeolite support amount) supported on the cell wall of the honeycomb structure of the present embodiment is from about 80 g/L to about 150 g/L. The amount of zeolite is more desirably from about 120 g/L to about 150 g/L.

In the present description, the amount of zeolite supported on the cell wall of the honeycomb structure refers to the weight of zeolite per one liter apparent volume of the honeycomb structure.

The apparent volume of the honeycomb structure includes a volume of adhesive layers and coat layers.

The zeolite is preferably ion-exchanged with metal ions.

Examples of the metal ions include a copper ion, an iron ion, a nickel ion, a zinc ion, a manganese ion, a cobalt ion, a silver ion, a vanadium ion, and the like. Each of these may be used alone or two or more kinds of these may be used in combination.

Preferable among the metal ions is copper ion or iron ion.

The following description will discuss one example of the method for manufacturing a honeycomb filter according to the present embodiment. Here, explanation will be made on a method for manufacturing a honeycomb filter in which zeolite is supported on the cell wall of a honeycomb structure formed of the honeycomb fired body shown in FIG. 2A and FIG. 2B.

First, a wet mixture for manufacturing a molded body is prepared by mixing silicon carbide powders having different average particle diameters as a ceramic material, an organic binder, a liquid plasticizer, a liquid lubricant, and water.

Next, the wet mixture is introduced into an extrusion molding apparatus and then extrusion-molded so as to manufacture a honeycomb molded body having a predetermined shape.

The honeycomb molded body is manufactured by using a die which can form a honeycomb molded body in which a large volume cell having a substantially octagonal shape and a large area in the cross section perpendicular to the longitudinal direction and a small volume cell having a substantially quadrangular shape and a small area in the cross section perpendicular to the longitudinal direction are alternately disposed, and the cell density, the thickness of the cell wall, and the ratio of the cross-sectional area of the large volume cell perpendicular to the longitudinal direction relative to the cross-sectional area of the small volume cell perpendicular to the longitudinal direction in the honeycomb molded body are respectively adjusted in predetermined ranges.

Next, cutting of both ends of the honeycomb molded body with a cutting apparatus is performed to cut the honeycomb molded body into a predetermined length. The cut honeycomb molded body is dried with a drying apparatus.

Then, a predetermined amount of a sealing material paste which is to become a sealing material is filled in one end of each of the large volume cells and one end of each of the small volume cells of the dried honeycomb molded body to seal the cells. Through the aforementioned process, a cell-sealed honeycomb molded body is manufactured.

As the sealing material paste, the wet mixture may be used.

Thereafter, degreasing is carried out to heat organic matters in the cell-sealed honeycomb molded body so that a honeycomb degreased body is manufactured. Shape of the honeycomb degreased body is almost the same as the shape of the honeycomb fired body shown in FIG. 2A and FIG. 2B.

The honeycomb degreased body is transported to a firing furnace and then fired at a temperature of from about 2000° C. to about 2300° C. under argon atmosphere, and thereby a honeycomb fired body having a shape shown in FIG. 2A and FIG. 2B is manufactured.

Next, binding is performed by applying an adhesive paste between the honeycomb fired bodies to form an adhesive paste layer and then drying and solidifying the adhesive paste layer to form an adhesive layer. Accordingly, a ceramic block in which a plurality of the honeycomb fired bodies are bonded with one another with an adhesive layer interposed therebetween is manufactured.

The adhesive paste to be preferably used is an adhesive paste including inorganic fibers and/or whiskers, an inorganic binder, and an organic binder.

In the binding, the plurality of the honeycomb fired bodies are arranged so that the first end faces of respective honeycomb fired bodies are disposed on the same side, and then the honeycomb fired bodies are bonded with one another.

Then, periphery cutting is carried out by cutting the periphery of the ceramic block with a diamond cutter so as to provide a substantially round pillar-shaped ceramic block.

Next, coating layer forming is performed by applying a coating material paste on the peripheral surface of the substantially round pillar-shaped ceramic block, and then drying and solidifying the coating material paste to form a coating layer.

As the sealing material paste, a paste that is the same as the adhesive paste may be used.

Through the foregoing process, a honeycomb structure can be manufactured.

Thereafter, a zeolite such as β-type zeolite ion-exchanged with an iron ion is supported on the cell wall of the honeycomb structure.

Zeolite is supported on the cell wall of the honeycomb structure by such a method, for example, that the honeycomb structure is dipped in a slurry containing zeolite, pulled up, and then heated.

The amount of zeolite to be supported may be controlled by a method of repeating the dipping of the honeycomb structure in a slurry and the heating, a method of changing the concentration of the slurry, or the like.

Through the foregoing process, it is possible to manufacture a honeycomb filter in which zeolite is supported on the cell wall of the honeycomb structure.

The following description will discuss effects of the honeycomb filter of the present embodiment.

(1) In the honeycomb filter according to the present embodiment, the plurality of cells in the honeycomb structure include large volume cells and small volume cells. Therefore, it may become easier to capture a large amount of PM in exhaust gases.

(2) In the honeycomb filter according to the present embodiment, the area ratio of a cross sectional area of the large volume cell perpendicular to the longitudinal direction relative to a cross sectional area of the small volume cell perpendicular to the longitudinal direction is from about 1.4 to about 2.4. Therefore, the honeycomb filter shows an excellent NOx conversion rate when used as a urea SCR device.

(3) In the honeycomb filter according to the present embodiment, the porosity of the cell wall of the honeycomb structure is from about 55% to about 65%. Therefore, a large amount of zeolite is more likely to be supported on the cell wall of the honeycomb structure.

(4) In the honeycomb filter according to the present embodiment, the cell density in a cross section perpendicular to the longitudinal direction of the honeycomb structure is from about 46.5 pcs/cm$^2$ to about 62.0 pcs/cm$^2$ (from about 300 pcs/inch$^2$ to about 400 pcs/inch$^2$). Thus, a filtration area of the honeycomb structure is more likely to become large, and as a result the rate of exhaust gases passing through the cell walls tends to be reduced.

Moreover, in the honeycomb filter according to the present embodiment, the thickness of the cell wall of the honeycomb structure is from about 0.2 mm to about 0.3 mm. Therefore, exhaust gas tends to diffuse easily and can take sufficient time to pass through the cell walls.

Accordingly, NOx in exhaust gas tends to sufficiently contact the zeolite supported on the cell walls. As a result, a honeycomb filter having a high NOx conversion rate may be obtained easily.

(5) In the honeycomb filter according to the present embodiment, the amount of the zeolite supported on the cell wall is from about 80 g/L to about 150 g/L. Therefore, use of the honeycomb filter of the present invention as a urea SCR device makes it easier to sufficiently convert NOx in exhaust gases.

EXAMPLES

The following description will discuss examples which specifically disclose the first embodiment of the present invention. The present invention is not limited only to those examples.

First, base materials 1 to 5 having different porosity from one another were manufactured.

(Manufacturing of Base Material 1)

Nine kinds of the base materials 1a, 1b, 1c, 1d, 1e, 1f, 1g, 1h, and 1i having a different cell cross-sectional shape from one another were manufactured as the base material 1.

(Manufacturing of Base Material 1a)

An amount of 46.6% by weight of coarse powder of silicon carbide having an average particle diameter of 20 μm and an amount of 20.0% by weight of fine powder of silicon carbide having an average particle diameter of 0.5 μm were mixed, and to the resulting mixture were added and kneaded 6.8% by weight of hollow acrylic particles having an average particle diameter of 21 μm as a pore-forming agent, 3.8% by weight of an organic binder (methylcellulose), 3.5% by weight of a lubricant (UNILUB, made by NOF Corporation), 1.6% by weight of a plasticizer (glycerin), and 17.7% by weight of water to prepare a wet mixture. The wet mixture was then extrusion-molded with a die to manufacture a raw honeycomb molded body having virtually the same shape as the shape shown in FIG. 2A and FIG. 2B with no cells being sealed.

Next, the raw honeycomb molded body was dried by using a microwave drying apparatus to obtain a dried body of the honeycomb molded body. Thereafter, sealing was performed by filling a paste having the same composition as that of the raw molded body (wet mixture) into predetermined cells, and then again drying was performed using a drying apparatus.

The dried honeycomb molded body was degreased at 400° C., and then fired at 2200° C. under normal pressure argon atmosphere for 3 hours so as to manufacture a honeycomb fired body made of a silicon carbide sintered body with a porosity of 60%, a size of 34.3 mm×34.3 mm×150 mm, the number of cells (cell density) of 54.3 pcs/cm$^2$ (350 pcs/inch$^2$) and a thickness of the cell wall of 0.28 mm. The honeycomb fired body manufactured through the above process was given as a base material 1a.

The porosity was measured by a weighing method.

Figure 3:
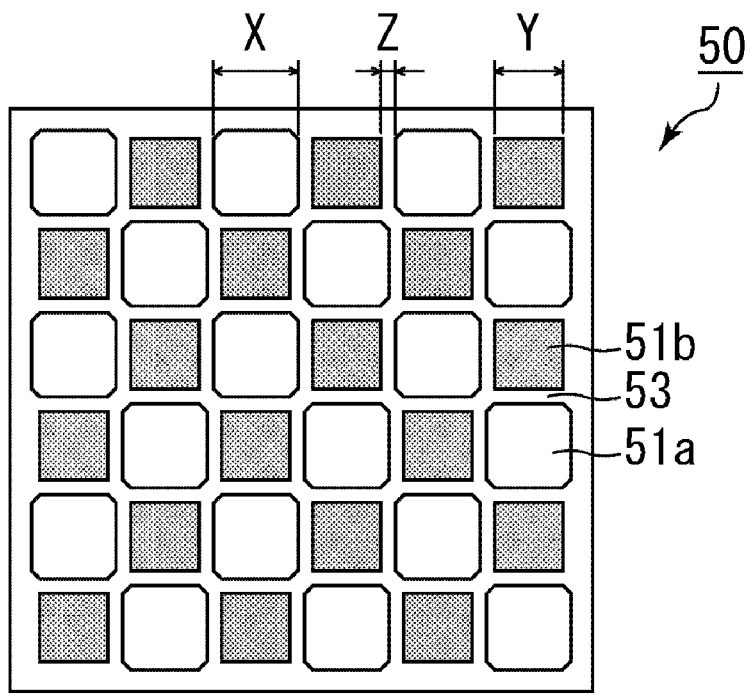
FIG. 3 is a side view of the first end face schematically showing the cell structure of a base material 1$a$ according to an embodiment of the present invention.

FIG. 3 is a side view of the first end face schematically showing the cell structure of the base material 1a.

In the base material 1a, as shown in FIG. 3, a cross sectional shape of a large volume cell 51a of the honeycomb fired body 50 is octagonal, and the length shown by the double-sided arrow "X" is 1.21 mm. A cross sectional shape of a small volume cell 51b is a quadrangle (substantially square), and the length of one side thereof (shown by the double-sided arrow "Y" in FIG. 3) is 0.97 mm. The thickness (shown by the double-sided arrow "Z" in FIG. 3) of a cell wall 53 between the large volume cell 51a and the small volume cell 51b is 0.28 mm.

An area of a cross section of the large volume cell perpendicular to the longitudinal direction is 1.40 mm$^2$, and an area of a cross section of the small volume cell perpendicular to the longitudinal direction is 0.94 mm$^2$. Therefore, an area ratio of the area of the cross section of the large volume cell perpendicular to the longitudinal direction relative to the area of the cross section of the small volume cell perpendicular to the longitudinal direction is 1.5.

(Manufacturing of Base Material 1b and Base Material 1c)

Figure 4:
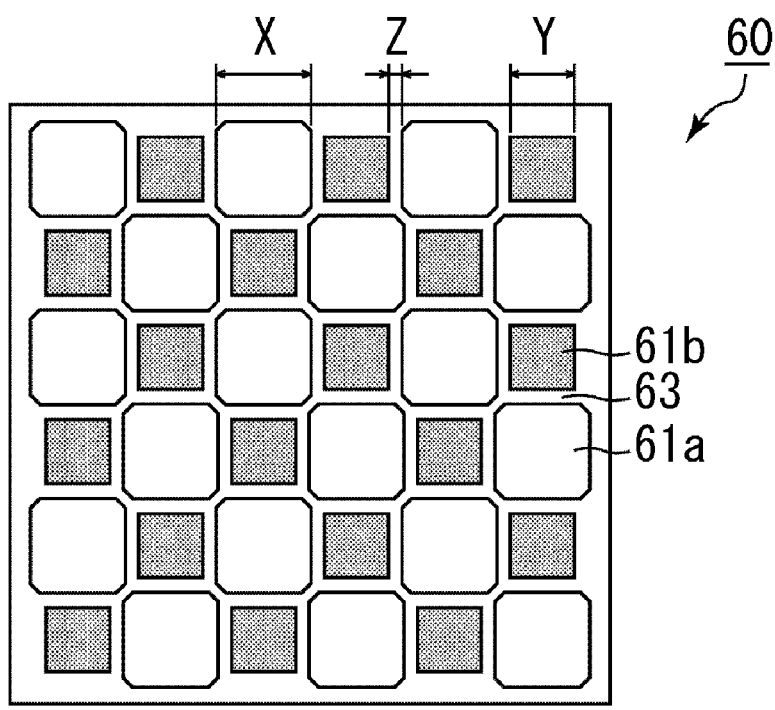
FIG. 4 is a side view of the first end face schematically showing the cell structure of a base material 1$b$ according to an embodiment of the present invention.
Figure 5:
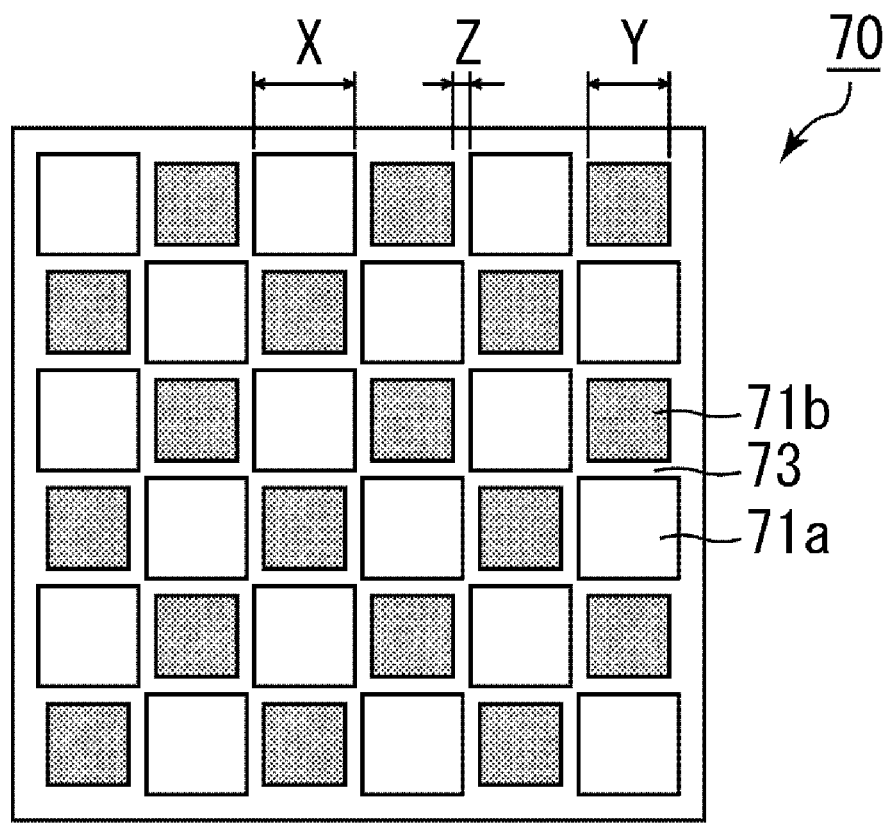
FIG. 5 is a side view of the first end face schematically showing the cell structure of a base material 1$c$ according to an embodiment of the present invention.

FIG. 4 is a side view of the first end face schematically showing the cell structure of the base material 1b. FIG. 5 is a side view of the first end face schematically showing the cell structure of the base material 1c.

The base material 1b and the base material 1c which were honeycomb fired bodies respectively having the cell structures with the shapes shown in FIG. 4 and FIG. 5 were manufactured according to the aforementioned manufacturing of the base material 1a while changing the shapes of the dies used in the extrusion molding.

In the base material 1b, as shown in FIG. 4, the cross sectional shape of a large volume cell 61a of the honeycomb fired body 60 is octagonal, and the length shown by the double-sided arrow "X" is 1.37 mm. The cross sectional shape of a small volume cell 61b is a quadrangle (substantially square), and the length of one side thereof (shown by the double-sided arrow "Y" in FIG. 4) is 0.87 mm. The thickness (shown by the double-sided arrow "Z" in FIG. 4) of a cell wall 63 between the large volume cell 61a and the small volume cell 61b is 0.28 mm.

An area of a cross section of the large volume cell perpendicular to the longitudinal direction is 1.81 mm$^2$, and an area of a cross section of the small volume cell perpendicular to the longitudinal direction is 0.76 mm$^2$. Therefore, an area ratio of the area of the cross section of the large volume cell perpendicular to the longitudinal direction relative to the area of the cross section of the small volume cell perpendicular to the longitudinal direction is 2.4.

In the base material 1c, as shown in FIG. 5, the cross sectional shape of a large volume cell 71a of the honeycomb fired body 70 is a quadrangle (substantially square), and the length shown by the double-sided arrow "X" is 1.18 mm. The cross sectional shape of a small volume cell 71b is a quadrangle (substantially square), and the length of one side thereof (shown by the double-sided arrow "Y" in FIG. 5) is 0.97 mm. The thickness (shown by the double-sided arrow "Z" in FIG. 5) of a cell wall 73 between the large volume cell 71a and the small volume cell 71b is 0.28 mm.

An area of a cross section of the large volume cell perpendicular to the longitudinal direction is 1.39 mm$^2$, and an area of a cross section of the small volume cell perpendicular to the longitudinal direction is 0.94 mm$^2$. Therefore, an area ratio of the area of the cross section of the large volume cell perpendicular to the longitudinal direction relative to the area of the cross section of the small volume cell perpendicular to the longitudinal direction is 1.5.

The porosity, the cell density, and the thickness of the cell wall of the base material 1b and the base material 1c are the same as those of the base material 1a.

(Manufacturing of Base Material 1d to Base Material 1i)

The base material 1d to base material 1i were manufactured by changing the shape of the die used in extrusion molding in the preparation of the base material 1a.

The thickness of the cell walls of the base material 1d, the base material 1e, the base material 1f, and the base material 1g was changed from that of the cell structure of the base material 1a. Specifically, the length of the double-sided arrow "Z" shown in FIG. 3 was changed to 0.30 mm in the base material 1d, 0.20 mm in the base material 1e, 0.33 mm in the base material 1f, and 0.18 mm in the base material 1g.

Due to the changes in the thickness of the cell wall, the cell density was changed to 46.5 pcs/cm$^2$ (300 pcs/inch$^2$) in the base material 1d, 62.0 pcs/cm$^2$ (400 pcs/inch$^2$) in the base material 1e, 43.4 pcs/cm$^2$ (280 pcs/inch$^2$) in the base material 1f, and 65.1 pcs/cm$^2$ (420 pcs/inch$^2$) in the base material 1g.

In the base material 1d, the base material 1e, the base material 1f, and the base material 1f, the lengths of the double-sided arrows "X" and "Y" shown in FIG. 3 are the same as those of the base material 1a, and thus the cross-sectional area of the large volume cell perpendicular to the longitudinal direction and the cross-sectional area of the small volume cell perpendicular to the longitudinal direction are also the same as those of the base material 1a. Therefore, an area ratio of a cross sectional area of the large volume cell perpendicular to the longitudinal direction relative to a cross sectional area of the small volume cell perpendicular to the longitudinal direction is 1.5 in all of the aforementioned base materials.

In the base material 1h, the length of the double-sided arrow "X" shown in FIG. 3 was changed to 1.18 mm and the length of the double-sided arrow "Y" shown in FIG. 3 was changed to 1.00 mm from those of the cell structure of the base material 1a.

The cross sectional area of the large volume cell perpendicular to the longitudinal direction was 1.31 mm$^2$, and the cross sectional area of the small volume cell perpendicular to the longitudinal direction was 1.00 mm$^2$. Thus, an area ratio of the cross sectional area of the large volume cell perpendicular to the longitudinal direction relative to the cross sectional area of the small volume cell perpendicular to the longitudinal direction is 1.3.

In the base material 1i, the length of the double-sided arrow "X" shown in FIG. 4 was changed to 1.38 mm and the length of the double-sided arrow "Y" shown in FIG. 4 was changed to 0.86 mm from those of the structure of the base material 1b.

The cross sectional area of the large volume cell perpendicular to the longitudinal direction was 1.83 mm$^2$, and the cross sectional area of the small volume cell perpendicular to the longitudinal direction is 0.73 mm$^2$. Thus, an area ratio of the cross sectional area of the large volume cell perpendicular to the longitudinal direction relative to the cross sectional area of the small volume cell perpendicular to the longitudinal direction is 2.5.

The porosity, the cell density, and the thickness of the cell wall of the base material 1h and the base material 1i are the same as those of the base material 1a.

The base material 1a to the base material 1i will be collectively referred to as base material 1 herein below.

Tables 1-1 and 1-2 show the compositions of the wet mixture and firing conditions used for manufacturing the base material 1.

(Manufacturing of Base Materials 2 to 5)

Base materials 2 to 5 were manufactured by manufacturing honeycomb fired bodies in the same manner as the manufacturing the base material 1a, except that the composition of the wet mixture and the firing conditions were changed as shown in Tables 1-1 and 1-2. The shapes of the base materials 2 to 5 are the same as that of the base material 1a. The porosity of the base material 2, the base material 3, the base material 4, and the base material 5 are 55%, 65%, 50%, and 70%, respectively.

Tables 1-1 and 1-2 show the compositions of the wet mixture and firing conditions used for manufacturing the base materials 2 to 5

TABLE 1-1

|  | SiC coarce powder | | SiC fine powder | | Methyl cellulose |
|---|---|---|---|---|---|
|  | Average pore diameter (μm) | Blending ratio (% by weight) | Average pore diameter (μm) | Blending ratio (% by weight) | Blending ratio (% by weight) |
| Base material 1a to 1i | 20 | 46.6 | 0.5 | 20.0 | 3.8 |
| Base material 2 | 20 | 47.5 | 0.5 | 20.3 | 3.9 |
| Base material 3 | 25 | 45.7 | 0.5 | 19.7 | 3.7 |
| Base material 4 | 20 | 48.3 | 0.5 | 20.8 | 3.9 |
| Base material 5 | 25 | 44.9 | 0.5 | 19.2 | 3.7 |

TABLE 1-2

|  | Base material | Porosity (%) | Cell density (pcs/cm$^2$) (Note) | Thickness of cell wall (mm) |
|---|---|---|---|---|
| Example 1 | 1a | 60 | 54.3 (350) | 0.28 |
| Example 2 | 2 | 55 | 54.3 (350) | 0.28 |
| Example 3 | 3 | 65 | 54.3 (350) | 0.28 |
| Example 4 | 1d | 60 | 46.5 (300) | 0.30 |
| Example 5 | 1e | 60 | 62.0 (400) | 0.20 |
| Example 6 | 1b | 60 | 54.3 (350) | 0.28 |
| Example 7 | 1c | 60 | 54.3 (350) | 0.28 |
| Example 8 | 1a | 60 | 54.3 (350) | 0.28 |
| Example 9 | 1a | 60 | 54.3 (350) | 0.28 |
| Comparative Example 1 | 4 | 50 | 54.3 (350) | 0.28 |
| Comparative Example 2 | 5 | 70 | 54.3 (350) | 0.28 |
| Comparative Example 3 | 1f | 60 | 43.4 (280) | 0.33 |
| Comparative Example 4 | 1g | 60 | 65.1 (420) | 0.18 |
| Comparative Example 5 | 1h | 60 | 54.3 (350) | 0.28 |
| Comparative Example 6 | 1i | 60 | 54.3 (350) | 0.28 |
| Comparative Example 7 | 1a | 60 | 54.3 (350) | 0.28 |
| Comparative Example 8 | 1a | 60 | 54.3 (350) | 0.28 |

(Note)
Unit in parentheses: pcs./inch$^2$ (Manufacturing of Honeycomb Structure)

Honeycomb structures 1 to 5 were manufactured by using the base materials 1 to 5, respectively, as honeycomb fired bodies.

The honeycomb structures manufactured by using the base materials 1a to 1i are referred to as the honeycomb structures 1a to 1i, respectively. Also, the honeycomb structures 1a to 1i are collectively referred to as a honeycomb structure 1.

Additionally, the honeycomb structures manufactured by using the base materials 2 to 5 were referred to as honeycomb structures 2 to 5, respectively.

The honeycomb structures 1 to 5 were manufactured according to the following procedure.

An adhesive paste was applied between the honeycomb fired bodies to form adhesive paste layers, and the adhesive paste layers were dried and solidified to form adhesive layers. Accordingly, a ceramic block having a quadrangular pillar shape in which sixteen pieces of the honeycomb fired bodies were bonded with one another with the adhesive layer interposed therebetween was manufactured.

In this procedure, a plurality of the honeycomb fired bodies were bonded in a manner that the first end faces of the respective honeycomb fired bodies were arranged on the same side.

As the adhesive paste, an adhesive paste containing 30% by weight of alumina fiber having an average fiber length of 20 μm, 21% by weight of silicon carbide powder having an average particle diameter of 0.6 μm, 15% by weight of silica sol (solid content 30% by weight), 5.6% by weight of carboxymethyl cellulose, and 28.4% by weight of water was used.

Thereafter, periphery cutting was performed on the quadrangular pillar-shaped ceramic block so that a round pillar-shaped ceramic block having a diameter of 142 mm was manufactured.

Next, a coating material paste was applied on the periphery of the round pillar-shaped ceramic block, and the coating material paste was dried and solidified at a temperature of 120° C. so that a coat layer was formed on the periphery of the ceramic block.

As the coating material paste, the same paste as the aforementioned adhesive paste was used.

Through the above procedure, a round pillar-shaped honeycomb structure having a size of 143.8 mm in diameter×150 mm in length was manufactured.

Next, honeycomb filters were manufactured in Examples 1 to 9 and Comparative Examples 1 to 8 by allowing the honeycomb structures 1 to 5 manufactured by using the base materials 1 to 5 to support zeolite.

Example 1

A sufficient amount of water is mixed with β-type zeolite powder (average particle diameter: 2 μm) ion-exchanged with an iron ion and then stirred to prepare a zeolite slurry. The honeycomb structure 1a was dipped in the zeolite slurry with one end side facing down for one minute. Thereafter, the resulting honeycomb structure 1a was dried at 110° C. for one hour, and further fired at 700° C. for one hour so that a zeolite supporting layer was formed.

The procedure of dipping in the zeolite slurry, drying and firing was repeated so that the amount of the formed zeolite supporting layer reached 120 g per one liter of the apparent volume of the honeycomb structure.

Through the above procedure, a honeycomb filter having a zeolite supporting amount of 120 g/L was manufactured.

Examples 2 to 9, and Comparative Examples 1 to 8

Honeycomb filters were manufactured in Examples 2 to 9 and Comparative Examples 1 to 8, by allowing the honeycomb structures manufactured by respectively using the base materials shown in Tables 2-1 and 2-2 to support zeolite in respective amounts shown in Tables 2-1 and 2-2.

The amounts of zeolite to be supported were controlled by changing the number of times to repeat the dipping into zeolite slurry, drying or firing.

(Measurement of Nox Conversion Rate)

NOx conversion rate was measured on the honeycomb filters manufactured in Examples 1 to 9 and Comparative Examples 1 to 8.

For measurement of NOx conversion rate, each of the honeycomb filters manufactured in Examples 1 to 9 and Comparative Example 1 to 8 was cut by a diamond cutter to prepare a single honeycomb fired body (34.3 mm×34.3 mm×150 mm). The cut-out honeycomb fired body was further cut shortened to prepare a short-length body in a size of 34.3 mm×34.3 mm×40 mm.

In the same manner as the aforementioned sealing and degreasing, cells of the short-length body were sealed so that one end of each of the cells of the short-length body was sealed with the adhesive paste. The short-length body with the sealed cells was degreased at 400° C. so that a sample for measuring NOx conversion rate was manufactured.

The NOx conversion rate was measured with a NOx conversion rate-measuring apparatus (Catalyst test system SIGU-2000, product of HORIBA, Ltd.).

The NOx conversion rate-measuring apparatus includes a gas generator and a reactor. A simulated exhaust gas generated by the gas generator was passed through the reactor in which the sample for evaluating NOx conversion rate was placed.

Composition (volume ratio) of the simulated exhaust gas includes NO:175 ppm, $NO_2$:175 ppm, $NH_3$:350 ppm, $O_2$:14%, $CO_2$:5%, $H_2O$:10%, and $N_2$:balance. This composition was obtained by controlling each the amount of the gas flow rate with a flow rate controller.

The temperature of the reactor was fixed at 200° C. As a condition to allow zeolite to contact the simulated exhaust gas, the space velocity (SV) was set at 70000 $hr^{-1}$.

The NOx concentration "$N_0$" before the simulated exhaust gas passed through the sample for evaluation and the NOx concentration "$N_1$" after the simulated exhaust gas passed through the sample for evaluation were measured, and then the NOx conversion rate was calculated in accordance with the following equation.

NOx conversion rate (%)=$[(N_0-N_1)/N_0]\times 100$

Tables 2-1 and 2-2 show the measurement results of the NOx conversion rate.

Tables 2-1 and 2-2 collectively show the base materials used, the porosity, the cell density, the thickness of the cell walls, the cell structure, the area ratio (area ratio of a cross sectional area of the large volume cell perpendicular to the longitudinal direction relative to a cross sectional area of the small volume cell perpendicular to the longitudinal direction), the zeolite supporting amount (amount of zeolite supported on cell walls), and the measurement results of the NOx conversion rate of the honeycomb filters in Examples 1 to 9, and Comparative Examples 1 to 8.

TABLE 2-1

| | Cell structure of the first end face (Fig. No.) | Area ratio | Zeolite supporting amount (g/L) | $NO_x$ conversion rate (%) |
| --- | --- | --- | --- | --- |
| Example 1 | FIG. 3 | 1.5 | 120 | 63 |
| Example 2 | FIG. 3 | 1.5 | 120 | 59 |
| Example 3 | FIG. 3 | 1.5 | 120 | 62 |
| Example 4 | FIG. 3 | 1.5 | 120 | 56 |
| Example 5 | FIG. 3 | 1.5 | 120 | 58 |
| Example 6 | FIG. 4 | 2.4 | 120 | 54 |
| Example 7 | FIG. 5 | 1.5 | 120 | 61 |
| Example 8 | FIG. 3 | 1.5 | 80 | 52 |
| Example 9 | FIG. 3 | 1.5 | 150 | 56 |
| Comparative Example 1 | FIG. 3 | 1.5 | 120 | 43 |
| Comparative Example 2 | FIG. 3 | 1.5 | 120 | 46 |
| Comparative Example 3 | FIG. 3 | 1.5 | 120 | 45 |
| Comparative Example 4 | FIG. 3 | 1.5 | 120 | 48 |
| Comparative Example 5 | FIG. 3 | 1.3 | 120 | 48 |
| Comparative Example 6 | FIG. 4 | 2.5 | 120 | 46 |
| Comparative Example 7 | FIG. 3 | 1.5 | 70 | 42 |
| Comparative Example 8 | FIG. 3 | 1.5 | 170 | 41 |

TABLE 2-2

| | Cell structure of the first end face (Fig. No.) | Area ratio | Zeolite supporting amount (g/L) | $NO_x$ conversion rate (%) |
| --- | --- | --- | --- | --- |
| Example 1 | FIG. 3 | 1.5 | 120 | 63 |
| Example 2 | FIG. 3 | 1.5 | 120 | 59 |
| Example 3 | FIG. 3 | 1.5 | 120 | 62 |
| Example 4 | FIG. 3 | 1.5 | 120 | 56 |
| Example 5 | FIG. 3 | 1.5 | 120 | 58 |
| Example 6 | FIG. 4 | 2.4 | 120 | 54 |
| Example 7 | FIG. 5 | 1.5 | 120 | 61 |
| Example 8 | FIG. 3 | 1.5 | 80 | 52 |
| Example 9 | FIG. 3 | 1.5 | 150 | 56 |
| Comparative Example 1 | FIG. 3 | 1.5 | 120 | 43 |
| Comparative Example 2 | FIG. 3 | 1.5 | 120 | 46 |
| Comparative Example 3 | FIG. 3 | 1.5 | 120 | 45 |
| Comparative Example 4 | FIG. 3 | 1.5 | 120 | 48 |
| Comparative Example 5 | FIG. 3 | 1.3 | 120 | 48 |
| Comparative Example 6 | FIG. 4 | 2.5 | 120 | 46 |
| Comparative Example 7 | FIG. 3 | 1.5 | 70 | 42 |
| Comparative Example 8 | FIG. 3 | 1.5 | 170 | 41 |

The NOx conversion rate was as high as 50% or more (52 to 63%) when the porosity was from about 55% to about 65%, the cell density was from about 46.5 pcs/$cm^2$ to about 62.0 pcs/$cm^2$ (from about 300 pcs/$inch^2$ to about 400 pcs/$inch^2$), the thickness of the cell walls was from about 0.2 mm to about 0.3 mm, the area ratio (area ratio of a cross sectional area of the large volume cell perpendicular to the longitudinal direction relative to a cross sectional area of the small volume cell perpendicular to the longitudinal direction) was from about 1.5 to about 2.4, and the zeolite supporting amount (amount of zeolite supported on cell walls) was from about 80 g/L to about 150 g/L as in Examples 1 to 9.

On the other hand, the NOx conversion rate was as low as less than 50% (41 to 48%) when any of the porosity, the cell density, the thickness of cell walls, the area ratio, and the zeolite supporting amount was out of the aforementioned ranges as in Comparative Examples 1 to 8.

In Example 7, the cross-sectional shape of the large volume cell is quadrangular, and is different from the cross-sectional shape (octagon) of the large volume cells in other Examples. However, the NOx conversion rate in Example 7 is 61% which almost is as high as the NOx conversion rate in Example 1.

The results indicate that the NOx conversion rate is not affected by the cross-sectional shape of the cell and is high as long as the porosity, the cell density, the thickness of cell walls, the area ratio, and the zeolite supporting amount are respectively within predetermined ranges.

As is proved by the results given above, the NOx conversion rate can be improved by controlling the porosity, the cell density, the thickness of cell walls, the area ratio, and the zeolite supporting amount respectively to be within the predetermined ranges.

Second Embodiment

The following description will discuss a second embodiment which is the one embodiment of the present invention.

In the present embodiment, the honeycomb structure forming the honeycomb filter includes a single honeycomb fired body. The honeycomb structure including a single honeycomb fired body is also referred to as an integral honeycomb structure.

Figure 6A:
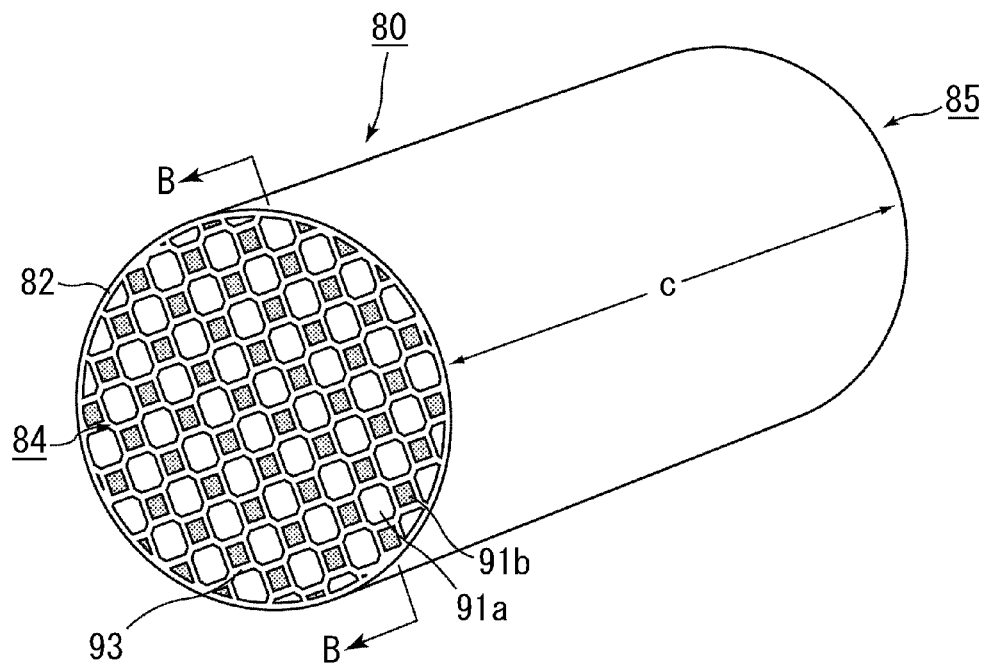
FIG. 6A is a perspective view that schematically shows one example of the honeycomb structure forming the honeycomb filter according to the second embodiment of the present invention.
Figure 6B:
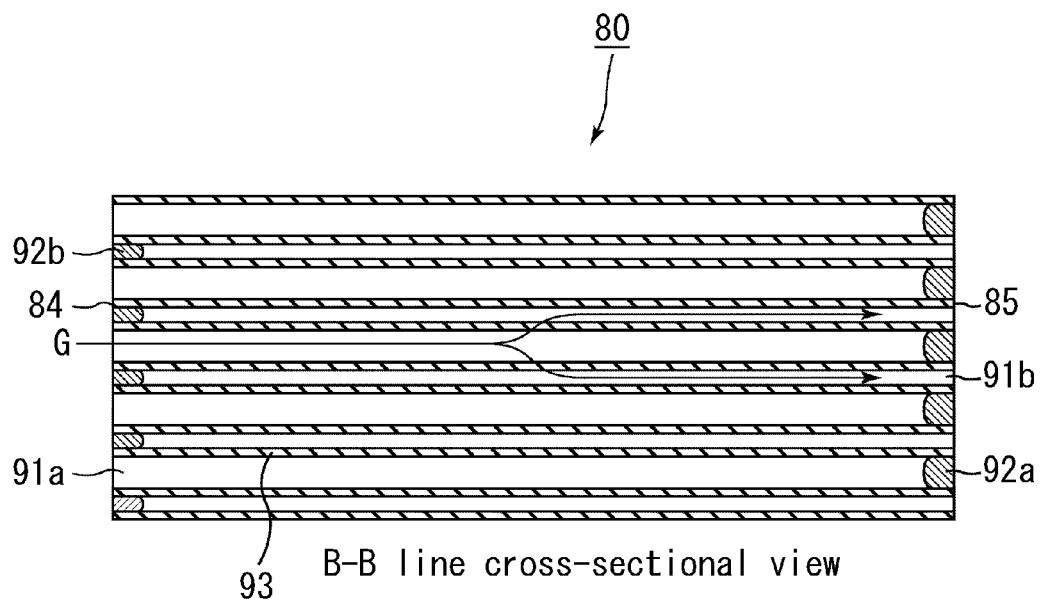
FIG. 6B is a B-B line cross-sectional view of the honeycomb structure shown in FIG. 6A.

FIG. 6A is a perspective view that schematically shows one example of the honeycomb structure forming the honeycomb filter according to the second embodiment of the present invention, and FIG. 6B is a B-B line cross-sectional view of the honeycomb structure shown in FIG. 6A.

A honeycomb structure 80 shown in FIG. 6A has a substantially round pillar shape having a first end face 84 and a second end face 85. The honeycomb structure 80 includes large volume cells 91a each having a relatively larger cross-sectional area perpendicular to the longitudinal direction thereof (direction of the double-sided arrow "c" in FIG. 6A) than small volume cells 91b and the small volume cells 91b each having a relatively smaller cross-sectional area perpendicular to the longitudinal direction thereof than the large volume cells 91a.

The large volume cells 91a have a substantially octagonal shape in the cross section perpendicular to the longitudinal direction thereof, and the small volume cells 91b have a substantially quadrangular shape in the cross section perpendicular to the longitudinal direction thereof.

A coat layer 82 is formed on a peripheral side face of the honeycomb structure 80.

The main component of constituent materials of the integral honeycomb structure is desirably cordierite or aluminum titanate.

The large volume cell 91a is open at an end portion on the first end face 84 side of the honeycomb structure 80 and is sealed with a sealing material 92a at an end portion on the second end face 85 side of the honeycomb structure 80. On the other hand, the small volume cell 91b is open at an end portion on the second end face 85 side of the honeycomb structure 80 and is sealed with a sealing material 92b at an end portion on the first end face 84 side of the honeycomb structure 80. A cell wall 93 interposed between the large volume cell 91a and the small volume cell 91b functions as a filter.

Namely, exhaust gases introduced to the large volume cell 91a surely passes through the cell walls 93 and then flows out from the small volume cell 91b.

An area ratio of the cross sectional area of the large volume cell perpendicular to the longitudinal direction relative to the cross sectional area of the small volume cell perpendicular to the longitudinal direction is from about 1.4 to about 2.4.

The aforementioned area ratio is more desirably from about 1.5 to about 2.4.

The porosity of the honeycomb structure is from about 55% to about 65%.

The cell density of the cross section of the honeycomb structure perpendicular to the longitudinal direction is from about 46.5 pcs/cm$^2$ to about 62.0 pcs/cm$^2$ (from about 300 pcs/inch$^2$ to about 400 pcs/inch$^2$). The thickness of the cell walls of the honeycomb structure is from about 0.2 mm to about 0.3 mm.

The honeycomb filter of the present embodiment is obtained by allowing the cell walls of the honeycomb structure to support zeolite.

Kinds of zeolite, amount of zeolite supported on the cell walls of the honeycomb structure of the present embodiment are the same as those in the first embodiment.

In order to manufacture the honeycomb filter of the present embodiment, the honeycomb molded body is manufactured in the same manner as in the first embodiment, except that the honeycomb molded body prepared by extrusion molding is larger than and in a different outer shape from the honeycomb molded body described in the first embodiment.

Other procedure according to the present embodiment is almost the same with the manufacturing process of the honeycomb filter according to the first embodiment. However, since the honeycomb structure forming the honeycomb filter includes a single honeycomb fired body in the present embodiment, the bonding is not necessary. Moreover, when a honeycomb molded body in a substantially round pillar shape is prepared, the periphery cutting is not necessary.

It is possible to manufacture a urea SCR device using the thus manufactured honeycomb filter in the present embodiment in the same manner as in the first embodiment.

The honeycomb filter of the present embodiment can exert the same effects (1) to (5) as those of the first embodiment.

Other Embodiments

In manufacturing a honeycomb filter by using an aggregated honeycomb structure, in the first embodiment of the present invention, a honeycomb structure is allowed to support zeolite. Further, it is possible to allow a plurality of honeycomb fired bodies to support zeolite, and then the zeolite-supporting honeycomb fired bodies are bonded with one another by interposing the adhesive layer therebetween.

In the honeycomb filter according to the embodiments of the present invention, the shapes of the large volume cell and the small volume cell included in the honeycomb structure are not limited to the shapes explained in the foregoing embodiments.

FIG. 7A, FIG. 7B, FIG. 7C, and FIG. 7D are each a side view that schematically shows one example the first end face of the honeycomb fired body forming the aggregated honeycomb structure according to an embodiment of the present invention.

Those figures are side views seen from the first end face side of the honeycomb fired body, namely, from the end face side where the small volume cells are sealed.

The following description will discuss the cross sectional shapes of the large volume cells and the small volume cells in other embodiments of the honeycomb structure with reference to the figures.

Figure 7A:
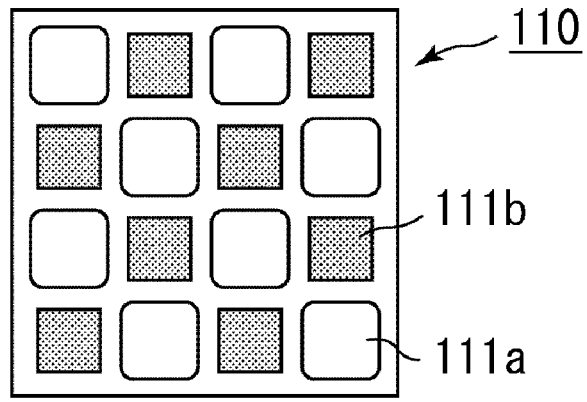
FIG. 7A, FIG. 7B, FIG. 7C, and FIG. 7D are each a side view that schematically shows one example the first end face of the honeycomb fired body forming the aggregated honeycomb structure according to an embodiment of the present invention.

In a honeycomb fired body 110 shown in FIG. 7A, a cross section perpendicular to the longitudinal direction of a large volume cell 111a has a substantially quadrangular shape in which portions corresponding to corners have an arcuate shape.

Figure 7B:
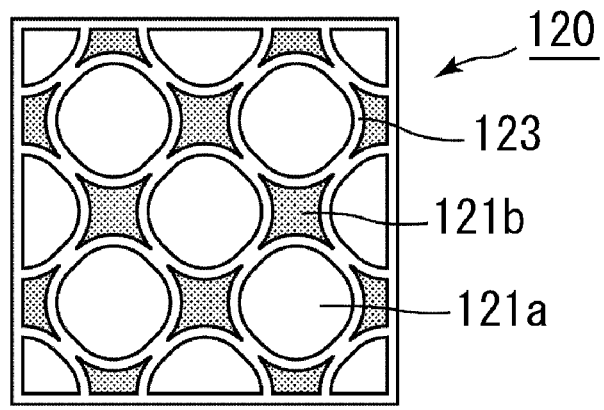

In a honeycomb fired body 120 shown in FIG. 7B, cross sections perpendicular to the longitudinal direction of a large volume cell 121a and a small volume cell 121b have curved sides.

Namely, in FIG. 7B, the shape of a cross section of a cell wall 123 drawn in a solid line is a curved line.

In the shape of the cross section of the large volume cell 121a, the cell wall 123 is convex to the outside from the center. On the other hand, in the shape of the cross section of the small volume cell 121b, the cell wall 123 is convex to the center from the outside.

The cell wall 123 has a wave shape that rises and falls in the horizontal and perpendicular directions of a cross section of the honeycomb fired body. Mountain portions (portions that exhibits the maximum amplitude in the sine curve) of the wave shape of the adjacent cell walls 123 make their closest approach to one another, whereby the large volume cells 121a whose cross section is dented outward and the small volume cells 121b whose cross section is dented inward are formed. The amplitude of the wave shape may be constant or variable, but it is desirably constant.

Figure 7C:
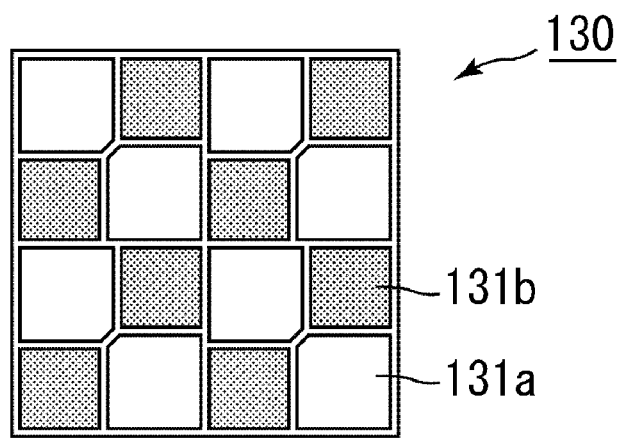

In a honeycomb fired body 130 shown in FIG. 7C, a cross section of a large volume cell 131a perpendicular to the longitudinal direction has a substantially pentagonal shape in which three corners have substantially right angles. A cross section of a small volume cell 131b perpendicular to the longitudinal direction has a substantially quadrangular shape, and the substantially quadrangular shape and another substantially quadrangular shape are placed at portions of a greater quadrangle to diagonally face each other.

Figure 7D:
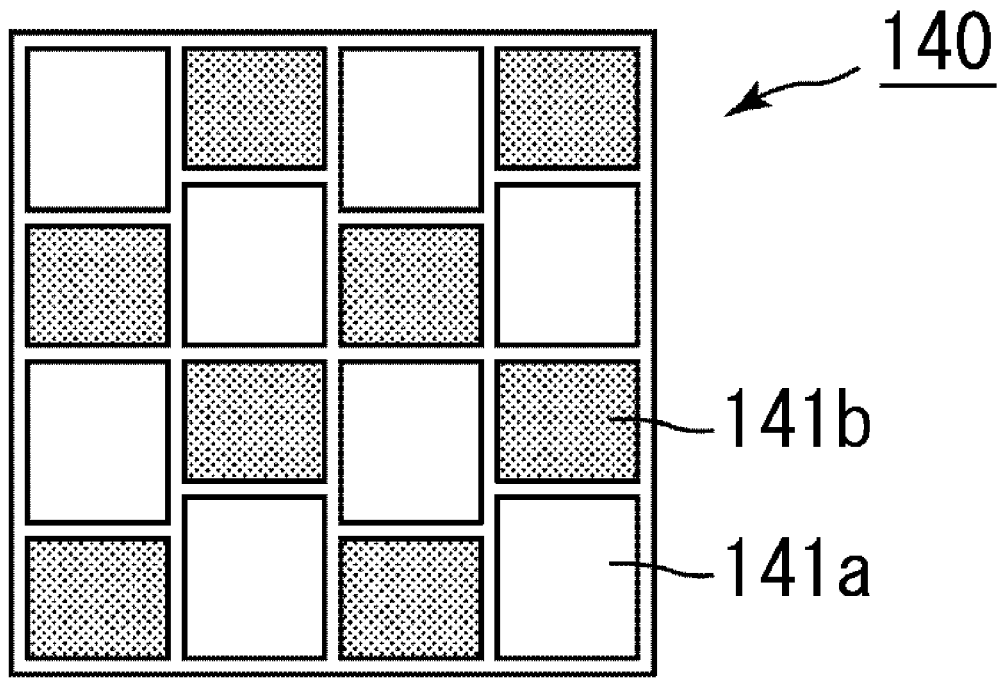

In a honeycomb fired body 140 shown in FIG. 7D, a cross section of a large volume cell 141a perpendicular to the longitudinal direction and a cross section of a small volume cell 141b perpendicular to the longitudinal direction have both a substantially quadrangular shape (substantially rectangle), and two large volume cells and two small volume cells are combined together to form an approximately square shape.

An integral honeycomb structure may have the cross-sectional shapes of the large volume cells and the small volume cells shown in FIG. 7A, FIG. 7B, FIG. 7C, and FIG. 7D.

In the present Description, the cross-sectional shape of the cells placed perpendicular to the longitudinal direction of the honeycomb structure is defined by the shape of the cells excluding imperfect cells (cells with a partially cut off cross section).

The shape of the honeycomb filter is not limited to a substantially round pillar shape, and may be optional pillar shapes such as a substantially cylindroid shape and a substantially polygonal pillar shape.

An average pore diameter of the honeycomb fired bodies forming the aggregated honeycomb structure or the integral honeycomb structure is preferably from about 5 μm to about 30 μm.

When the average pore diameter of the honeycomb fired body is about 5 μm or more, particulates are less likely to cause clogging of pores. When the average pore diameter of the honeycomb fired body is about 30 μm or less, particulates are less likely to pass through the pores, and thus the particulates may be easily captured. Accordingly, the honeycomb fired body is more likely to function as a filter sufficiently.

The pore diameter may be measured through a conventionally known method such as a mercury porosimetry method, Archimedes method, and a measuring method using a scanning electronic microscope (SEM).

The main component of constituent materials of the honeycomb fired body forming the aggregated honeycomb structure or the integral honeycomb structure is not limited to silicon carbide, and may include other ceramic material, for example, a nitride ceramic such as aluminum nitride, silicon nitride, boron nitride, and titanium nitride; a carbide ceramic such as zirconium carbide, titanium carbide, tantalum carbide, and tungsten carbide; and oxide ceramics such as alumina, zirconia, cordierite, mullite, and aluminum titanate, and the like.

Non-oxide ceramics are desirable for use as the main component of the constituent material of the honeycomb structure among the possible components, and silicon carbide is particularly desirable. This is because silicon carbide is excellent in thermal resistance, mechanical strength, and thermal conductivity.

Moreover, silicon-containing ceramics, which contains metallic silicon with the above-mentioned ceramics, and ceramics bound by silicon or silicate compounds can also be used as the constituent material of the honeycomb structure. And out of these, those (silicon-containing silicon carbide) of ceramics containing metallic silicon are preferable.

In particular, it is desirable to use a silicon-containing silicon carbide containing about 60% by weight or more of silicon carbide.

The particle diameter of the ceramic powder to be used in preparing the honeycomb fired bodies forming the aggregated honeycomb structure or the integral honeycomb structure is not particularly limited, and the ceramic powder that tends not to cause the case where the size of the honeycomb fired body manufactured by the subsequent firing treatment becomes smaller than that of a degreased honeycomb molded body prepared through the degreasing is preferable. A powder having a combination of 100 parts by weight of powder having an average particle diameter of from about 1.0 μm to about 50 μm, and from about 5 parts by weight to about 65 parts by weight of powder having an average particle diameter of from about 0.1 μm to about 1.0 μm is preferable.

The firing temperature needs to be controlled in order to control the pore diameter and the like of the honeycomb fired body; however, the pore diameter can also be controlled by controlling the particle diameter of the ceramic powder.

The organic binder in the honeycomb fired body to be used in preparing the honeycomb fired bodies forming the aggregated honeycomb structure or the integral honeycomb structure is not particularly limited, and examples thereof include methyl cellulose, carboxymethyl cellulose, hydroxyethyl cellulose, polyethylene glycol, and the like. Methylcellulose is preferable among the above examples. In general, the blending amount of the organic binder is desirably from about 1 part by weight to about 10 parts by weight with respect to 100 parts by weight of the ceramic powder.

The plasticizer to be contained in the wet mixture is not particularly limited, and examples thereof include glycerin or the like.

Also, the lubricant to be contained in the wet mixture is not limited, and examples thereof include polyoxy alkylene-based compounds such as polyoxyethylene alkyl ether, polyoxypropylene alkyl ether, and the like.

Specific examples of the lubricant include polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples of the dispersant solution include water, an organic solvent such as benzene, alcohol such as methanol, and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres including an oxide ceramic, spherical acrylic particles, and graphite may be added to the wet mixture.

With respect to the balloons, not particularly limited, for example, alumina balloons, glass micro-balloons, shirasu balloons, fly ash balloons (FA balloons), mullite balloons and the like may be used. Out of these, alumina balloons are more desirably used.

What is claimed as new and desired to be secured by Letters Patent of the United States is:

1. A honeycomb filter comprising:
    a honeycomb structure having cell walls extending along a longitudinal direction of the honeycomb structure to define cells between the cell walls, each of the cells being sealed at either end of each of the cells; and
    a zeolite supported on the cell walls of the honeycomb structure,
    wherein
    an amount of the zeolite supported on the cell walls is from about 80 g/L to about 150 g/L,
    a porosity of the cell walls of the honeycomb structure is from about 55% to about 65%,
    a cell density in a cross section perpendicular to the longitudinal direction of the honeycomb structure is from about 46.5 pcs/cm$^2$ to about 62.0 pcs/cm$^2$,
    a thickness of the cell walls of the honeycomb structure is from about 0.2 mm to about 0.3 mm,
    the cells include a large volume cell and a small volume cell, and
    an area ratio of a cross sectional area of the large volume cell perpendicular to the longitudinal direction relative to a cross sectional area of the small volume cell perpendicular to the longitudinal direction is from about 1.4 to about 2.4.

2. The honeycomb filter according to claim 1, wherein
    a cross section of the large volume cell perpendicular to the longitudinal direction has a substantially octagonal shape, and
    a cross section of the small volume cell perpendicular to the longitudinal direction has a substantially quadrangular shape.

3. The honeycomb filter according to claim 1, wherein
    a cross section of the large volume cell perpendicular to the longitudinal direction has a substantially quadrangular shape, and
    a cross section of the small volume cell perpendicular to the longitudinal direction has a substantially quadrangular shape.

4. The honeycomb filter according to claim 1, wherein
    the zeolite comprises at least one of β-type zeolite, Y-type zeolite, ferrierite, ZSM-5 type zeolite, mordenite, faujasite, A-type zeolite, L-type zeolite, SAPO, and MeAPO.

5. The honeycomb filter according to claim 4, wherein
    the zeolite comprises at least one of a β-type zeolite, a ZSM-5 type zeolite, and a SAPO.

6. The honeycomb filter according to claim 5, wherein
    the SAPO comprises at least one of SAPO-5, SAPO-11, and SAPO-34.

7. The honeycomb filter according to claim 6, wherein
    the SAPO comprises SAPO-34.

8. The honeycomb filter according to claim 4, wherein
    the MeAPO comprises MeAPO-34.

9. The honeycomb filter according to claim 1, wherein
    the zeolite is ion-exchanged with metal ions.

10. The honeycomb filter according to claim 9, wherein
    the metal ions comprise at least one of a copper ion, an iron ion, a nickel ion, a zinc ion, a manganese ion, a cobalt ion, a silver ion, and a vanadium ion.

11. The honeycomb filter according to claim 10, wherein
    the zeolite is ion-exchanged with at least one of a copper ion and an iron ion.

12. The honeycomb filter according to claim 1, wherein
    the honeycomb structure comprises a plurality of honeycomb fired bodies combined with one another with an adhesive layer interposed between the plurality of honeycomb fired bodies.

13. The honeycomb filter according to claim 12, wherein
    a main component of constituent materials of the honeycomb structure comprises at least one of silicon carbide and silicon carbide containing silicon.

14. The honeycomb filter according to claim 1, further comprising:
    a coat layer formed on a periphery of the honeycomb structure.

15. The honeycomb filter according to claim 1, wherein
    an area ratio of a cross-sectional area of the large volume cell perpendicular to the longitudinal direction relative to a cross-sectional area of the small volume cell perpendicular to the longitudinal direction is from about 1.5 to about 2.4.

16. The honeycomb filter according to claim 1, wherein
    the amount of the zeolite supported on the cell wall is from about 120 g/L to about 150 g/L.

17. The honeycomb filter according to claim 1, wherein
    the honeycomb structure comprises a single honeycomb fired body.

18. The honeycomb filter according to claim 17, wherein
    a main component of constituent materials of the honeycomb structure comprises at least one of cordierite and aluminum titanate.

19. The honeycomb filter according to claim 1, wherein
an average pore diameter of the cell walls of the honeycomb structure is from about 5 µm to about 30 µm.

20. The honeycomb filter according to claim 1, wherein
a cross section perpendicular to a longitudinal direction of the large volume cell has a substantially quadrangular shape in which portions corresponding to corners have an arcuate shape, and
a cross section perpendicular to a longitudinal direction of the small volume cell has a substantially quadrangular shape.

21. The honeycomb filter according to claim 1, wherein
cross sections perpendicular to a longitudinal direction of the large volume cell and the small volume cell have curved sides.

22. The honeycomb filter according to claim 1, wherein
a cross section of the large volume cell perpendicular to the longitudinal direction has a substantially pentagonal shape in which three corners have substantially right angles,
a cross section of the small volume cell perpendicular to the longitudinal direction has a substantially quadrangular shape, and
the substantially quadrangular shape and another substantially quadrangular shape are placed at portions of a greater quadrangle to diagonally face each other.

23. The honeycomb filter according to claim 1, wherein
a cross section of the large volume cell perpendicular to the longitudinal direction and a cross section of the small volume cell perpendicular to the longitudinal direction both have a substantially quadrangular shape, two large volume cells and two small volume cells being combined together to form an approximately square shape.

24. The honeycomb filter according to claim 1, wherein
the honeycomb filter is used as a urea SCR device.

25. The honeycomb filter according to claim 1, wherein
said honeycomb structure contains only one or more large volume cell and one or more small volume cell;
each large volume cell has a first cross sectional area; and
each small volume cell has a second cross sectional area that is smaller than the first cross sectional area.

26. The honeycomb filter according to claim 25, wherein
each large volume cell is open at an inlet side of said honeycomb filter and sealed at an outlet side of said honeycomb filter; and
each small volume cell is sealed at the inlet side of said honeycomb filter and open at the outlet side of said honeycomb filter.

27. The honeycomb filter according to claim 1, wherein
each large volume cell is open at an inlet side of said honeycomb filter and sealed at an outlet side of said honeycomb filter; and
each small volume cell is sealed at the inlet side of said honeycomb filter and open at the outlet side of said honeycomb filter.

* * * * *